United States Patent [19]
Winston et al.

[11] Patent Number: 5,967,140
[45] Date of Patent: *Oct. 19, 1999

[54] NONIMAGING SOLAR COLLECTOR

[76] Inventors: Roland Winston, 5217C University Ave., Chicago, Ill. 60615; Harald Reis, CH5232, Villigen, Switzerland

[ * ] Notice: This patent is subject to a terminal disclaimer.

[21] Appl. No.: 09/199,215

[22] Filed: Nov. 24, 1998

Related U.S. Application Data

[63] Continuation of application No. 08/934,090, Sep. 19, 1997.
[51] Int. Cl.$^6$ ........................................... F24J 2/10
[52] U.S. Cl. ............................................ 126/657; 126/658
[58] Field of Search .................................... 126/651–655, 126/657, 658

[56] References Cited

U.S. PATENT DOCUMENTS

| | | | |
|---|---|---|---|
| 4,246,891 | 1/1981 | Lambert | 126/657 |
| 4,286,580 | 9/1981 | Sitnan | 126/657 |
| 5,537,991 | 7/1996 | Winston et al. | 126/657 |

*Primary Examiner*—Carroll B. Dority

[57] ABSTRACT

A nonimaging solar collector. A method and article of manufacture of a solar collector includes an outer housing transparent to light, a reflector element position asymmetrically within the outer housing, an absorber disposed within the outer housing, and a heat conduction fin coupled to the absorber and having a wedge shape which tapers to a smaller thickness as a function of increasing radial separation from the absorber. The heat conductor fin can be positioned at a variety of angular positions.

6 Claims, 4 Drawing Sheets

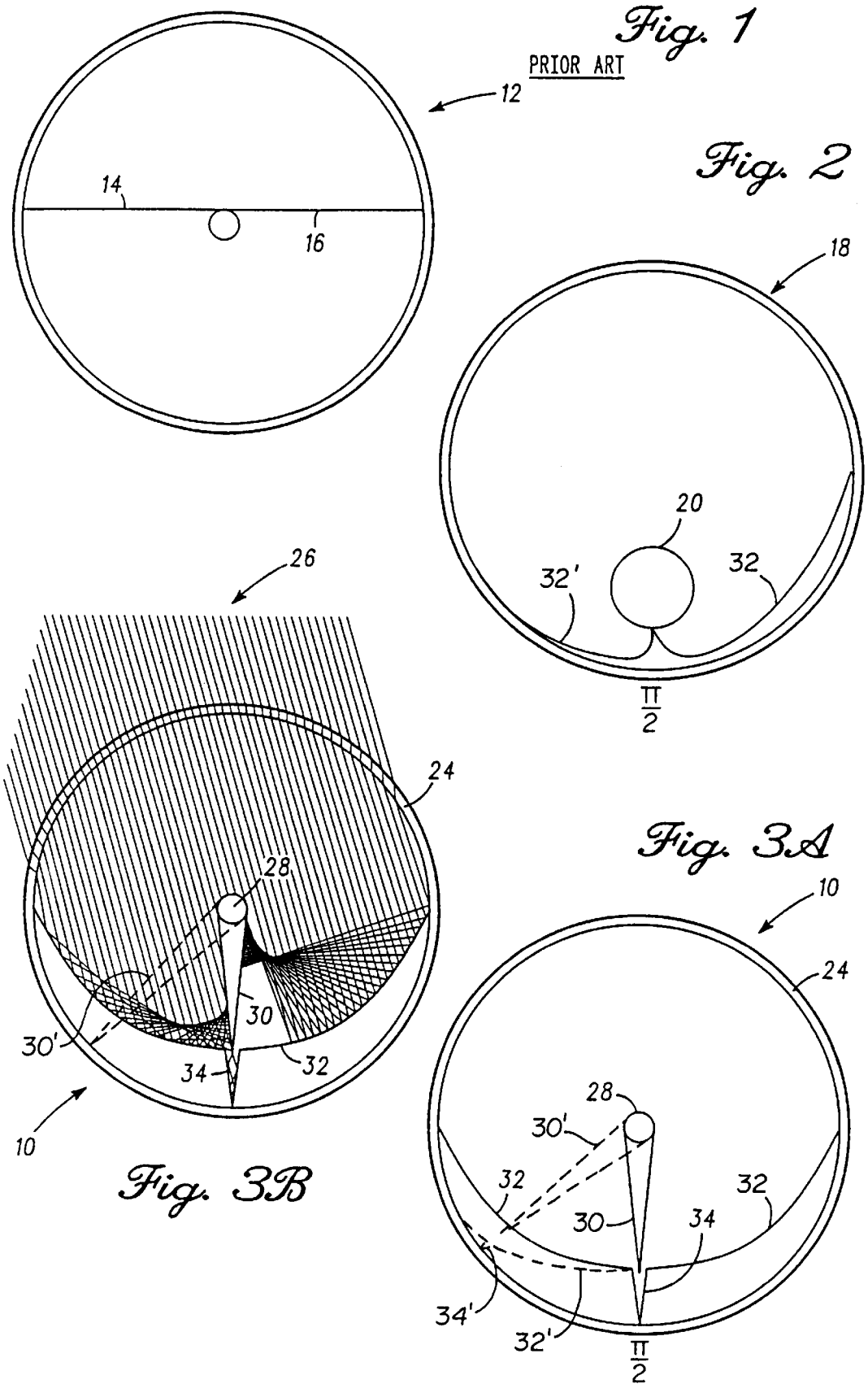

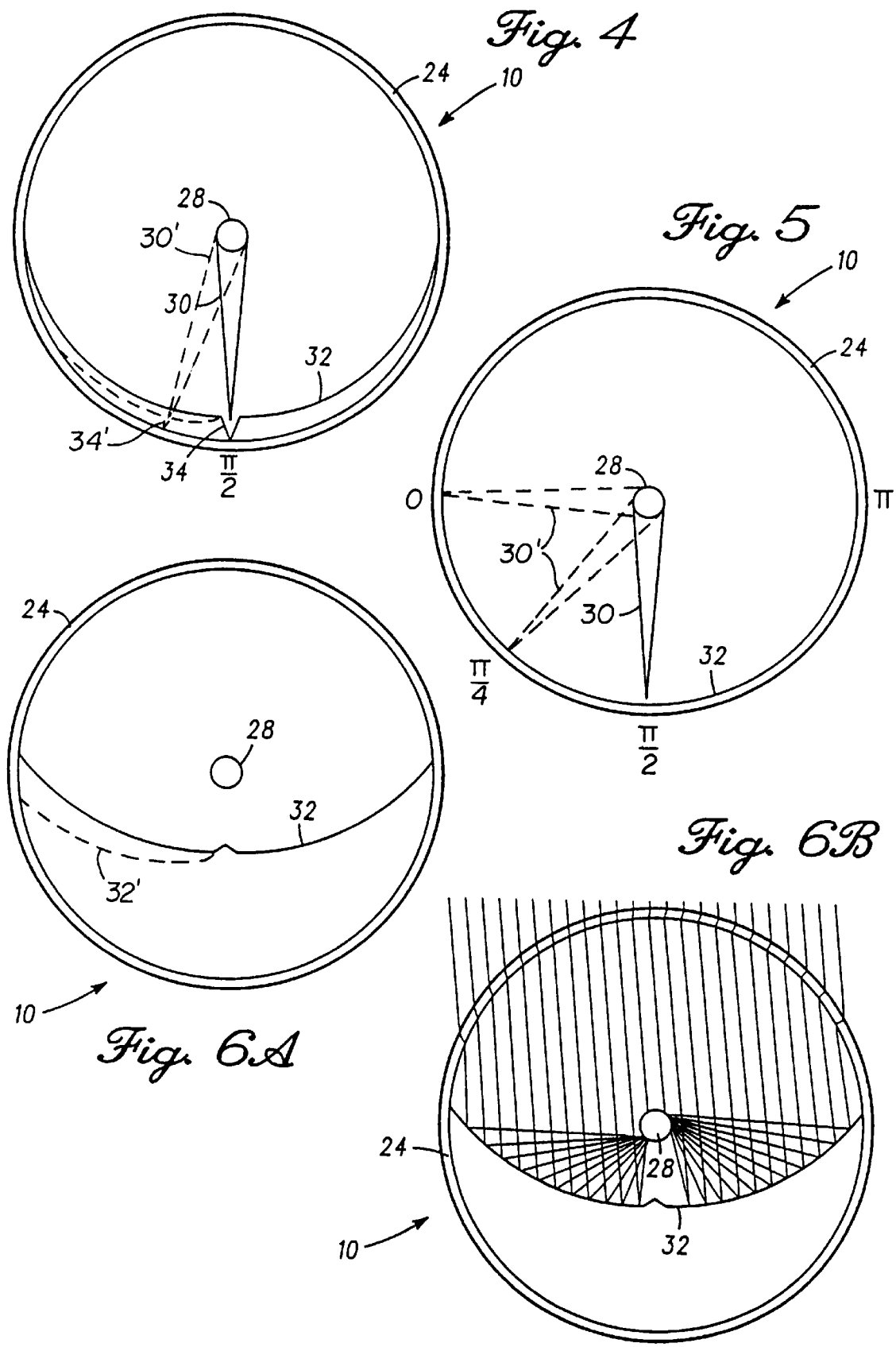

5,967,140

NONIMAGING SOLAR COLLECTOR

This application is a continuation of application Ser. No. 08/934,090 filed Sep. 19, 1997.

BACKGROUND OF THE INVENTION

The present invention is concerned with a nonimaging concentrator for light. More particularly, the invention is concerned with a solar energy concentrator or collector having an absorber disposed within a glass housing and a reflector asymmetrically disposed in the housing enabling improved nonimaging light concentration, such as an evacuated cylindrical reflector tube. This absorber geometry can also include a gap loss reduction V groove which can be positioned in an asymmetric manner relative to a wedge shaped heat conductor fin coupled to the absorber.

Nonimaging concentrators and their advantages are well known in the art (see, for example, U.S. Pat. Nos. 3,957,031; 4,002,499; 4,003,638; 4,230,095; 4,387,961; 4,359,265; and 5,289,356 incorporated by reference herein). In these previous methodologies, the device is constructed using a given absorber shape, usually a cylindrical tube, and then the appropriate nonimaging reflector is designed. This emphasis was therefore primarily on developing new reflector designs to optimize collector efficiency. There has recently been made available new types of high performance absorber materials which can be disposed on flexible substrates. These absorbers have an absorbance typically greater than 90% over the solar spectrum, while the hemispherical emittance at operating temperatures is quite low.

It is therefore an object of the invention to provide an improved nonimaging solar collector and method of use thereof.

It is another object of the invention to provide a novel nonimaging solar collector having an absorber concentrically disposed within a glass housing and an asymmetrically disposal reflector enabling improved nonimaging light concentration.

It is a further object of the invention to provide an improved nonimaging solar collector having an outer housing and a concentrically disposed tubular absorber with an asymmetrically disposed wedge shaped heat conduction fin.

It is yet a further object of the invention to provide a novel nonimaging solar collector having a heat conduction fin disposed asymmetrically relative to a reflector.

It is also an object of the invention to provide a novel nonimaging solar collector having a cylindrical reflector and tubular absorber coupled to a conically shaped cross sectional heat conductor disposed between zero and Pi relative to a reflector.

It is yet another object of the invention to provide an improved solar collector having an absorber concentrically disposed within a reflector and coupled conical cross section heat conductor which can be positioned over a range of angles to optimize efficiency.

It is still a further object of the invention to provide a solar collector utilizing a variety of reflectors asymmetrically disposed relative to a symmetry line of the concentrator.

It is another object of the invention to provide a method and article of manufacture for providing high solar collector efficiency with a heat exchange channel design having a V groove asymmetrically positioned relative to a reflector surface.

Other objects and advantages of the invention will be apparent from the detailed description and drawings described hereinbelow.

BRIEF DESCRIPTION OF THE DRAWINGS

FIG. 1 illustrates a prior art solar collector with a flat fin conductor;

FIG. 2 illustrates a two-dimensional end view of a cylindrical nonimaging solar collector constructed in accordance with a form of the invention with an absorber disposed noncentrically within a cusp shaped asymmetric reflector;

FIG. 3A illustrates a cross-sectional view along 3A—3A on FIG. 3D of a nonimaging solar collector having an absorber concentrically disposed within a reflector with a V-groove gap loss suppressor and the absorber further includes a coupled heat conductor fin having a conically shaped cross section;

FIG. 3B shows a ray trace for the symmetric form of collector of FIG. 3A;

FIG. 4 illustrates other versions of the collectors of FIG. 3 but with increased angle of acceptance;

FIG. 5 illustrates variations on the solar collector of FIG. 3 but without the V-groove gap loss suppressor element;

FIG. 6A illustrates a nonimaging collector with a concentric tubular absorber and several forms of raised reflector contours and FIG. 6B illustrates a ray trace for the collector with symmetric reflector of FIG. 6A;

DETAILED DESCRIPTION OF PREFERRED EMBODIMENTS

Figure 3C:
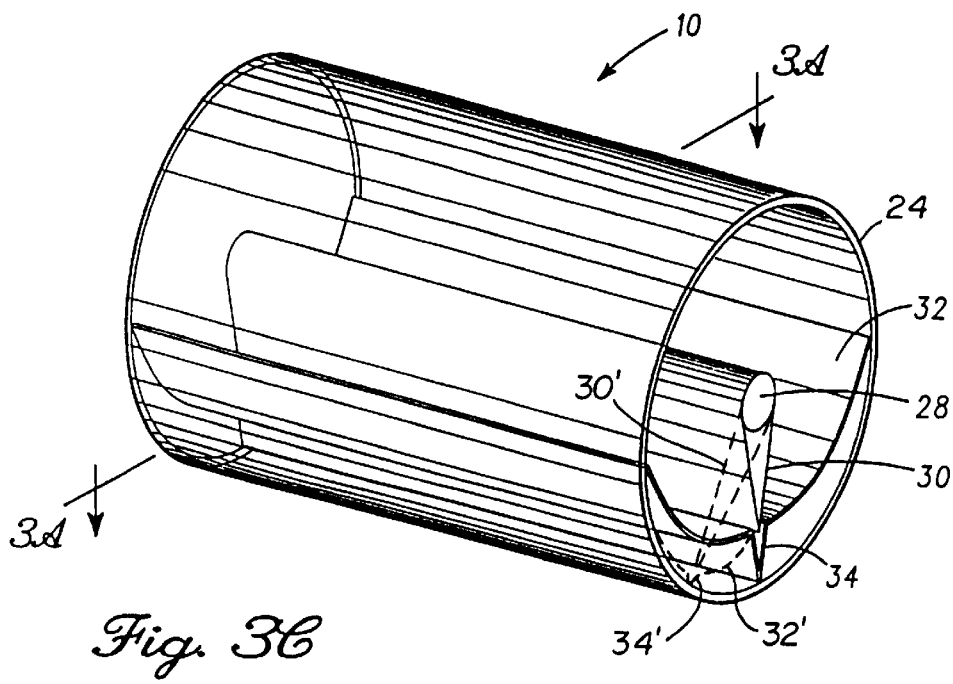
FIG. 3C illustrates a perspective view of the solar collector of FIG. 3A.
Figure 3D:
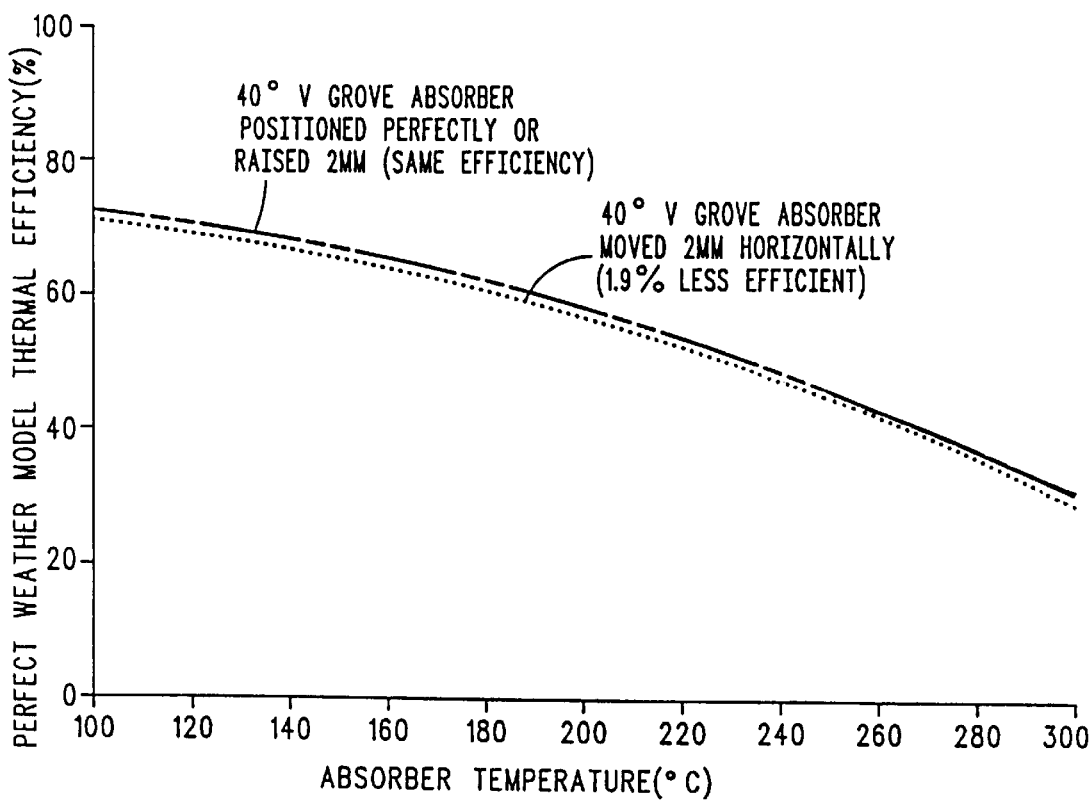
FIG. 3D illustrates a plot of thermal performance of the symmetric geometry 40° V-groove collector of FIG. 3A.

Nonimaging solar collectors constructed in accordance with the various forms of the invention are shown in FIGS. 3–6 and indicated generally at 10. A prior art collector design is shown for comparison in FIG. 1. The prior art collector 12 of FIG. 1 has heat conductor fins 14 and 16 which both radiate heat so that thermal performance is poor at temperatures above about 100° C. In the solar collector 10 shown in FIG. 2 a first reflector 32 and second reflector 32' are asymmetrically disposed relative to the cusp absorber 20. This asymmetric structure has enabled improved efficiency of collection. In this embodiment, the absorber 20 is also noncentrically disposed.

In a more preferred embodiment the nonimaging solar collector 10 of FIGS. 3A–3C includes an outer glass tube housing 24 which is transparent, allowing entry of light rays 26 into the evacuated interior of the housing 24. The housing 24 is shown as cylindrical in shape but can take on other geometries suitable for the functions described herein. The light rays 26 either directly strike absorber tube 28 or reflect from reflector surface 32 to impinge upon the absorber tube 28 and thereby concentrate the collected light. In the preferred embodiment this absorber tube 28 can be shapes other than shown in the figures but is concentrically positioned relative to the housing 24. The absorber tube 28 further can include a wedge shaped heat conductor 30 (see FIG. 3C) which in cross-section collectively appears with the absorber tube 28 as an "ice cream cone" geometry, as noted in FIGS. 3A, 3B, 4 and 5.

As further noted in FIGS. 3A–3C 4 and 5, the heat conductor 30 can be rotated from the π/2 portion at "six o'clock" to other angular positions (shown in phantom as conductor 30'), and this results in improved collection efficiency. At π/2, for normal incidence of light on the collector 10 the irradiance on the heat conductor 30 (or 30') is from a distance of r/2 to r, where r is the radial length of the heat conductor 30 (or 30'). For position of zero and π (see FIG. 5) the irradiance is more uniform as a consequence of the angle of light incidence. Better uniformity of irradiance improves heat transfer to a working fluid disposed within the conductor 30 (or 30') and thus improves performance.

Measurements were carried out for the zero (or π) design and characterized performance by stagnation temperature, which is the equilibrium temperature of the absorber tube 28 when no heat is removed. Three of the absorber tubes 28 were measured under 1 KW/square meter insolation, and stagnation temperatures of 326,334 and 330 degrees Centrigrade were measured. Those values are quite high for fixed solar collectors.

In another more preferred embodiment shown in FIGS. 3A, 4 and 6A, the reflector 32 (as in FIG. 2) is no longer symmetrically disposed in a mirror image location relative to a vertical plane along π/2. The reflector now comprises the reflector 32 and the reflector 32'. This asymmetry has further enabled achieving improved efficiency of solar collection. The degree of asymmetry between the reflector 32 and the reflector 32' can be adjusted depending on the orientation of incoming light to optimize efficiency.

In another preferred embodiment (see FIGS. 3A–3C, 4 and 5) reflector surface 32 includes a gap loss reduction V-groove 34. This groove 34 suppresses energy absorption gap loss which would otherwise occur when there is a space between the reflector surface 32 and the wedge shaped heat conductor 30. In FIG. 3A the angle of acceptance for the absorber is about 40° which would make the collector 10 suitable for east-west orientation without need of any solar tracking mechanism. This particular angular acceptance with the associated V-groove 34 provides excellent tolerance for vertical positioning errors in placement of the absorber 30, as well as good tolerance for horizontal displacements (see FIG. 3D).

In another form of the invention a V-groove 34' is disposed in an asymmetric angular position (see FIGS. 3A and 4) which also improves collection efficiency. Preferably the heat conductor 30' is aligned with the V-groove 34' list can be asymmetrically positioned without loss of much efficiency.

The collectors 10 of FIG.4 have a smaller radius of curvature for the reflector surface 32 (or 32'), resulting in a wider, angle of acceptance (about 70°). This embodiment would allow the collector 10 to be suitable for north-south or east-west orientation without need of any solar tracking device.

The collector 10 of FIG. 5 is the limiting case of the embodiments of FIGS. 3 and 4 where the radius of curvature of the reflector surface 32 is coincident with the inner surface of the glass tube housing 24. The embodiment with the heat conductor 30 at π/2 has an acceptance angle approaching 90°. This form of the collector 10 further simplifies the construction procedure for manufacture of the collector 10. In addition the other embodiment having the heat conductor 30' at other angles also would be simple to manufacture.

Figure 7:
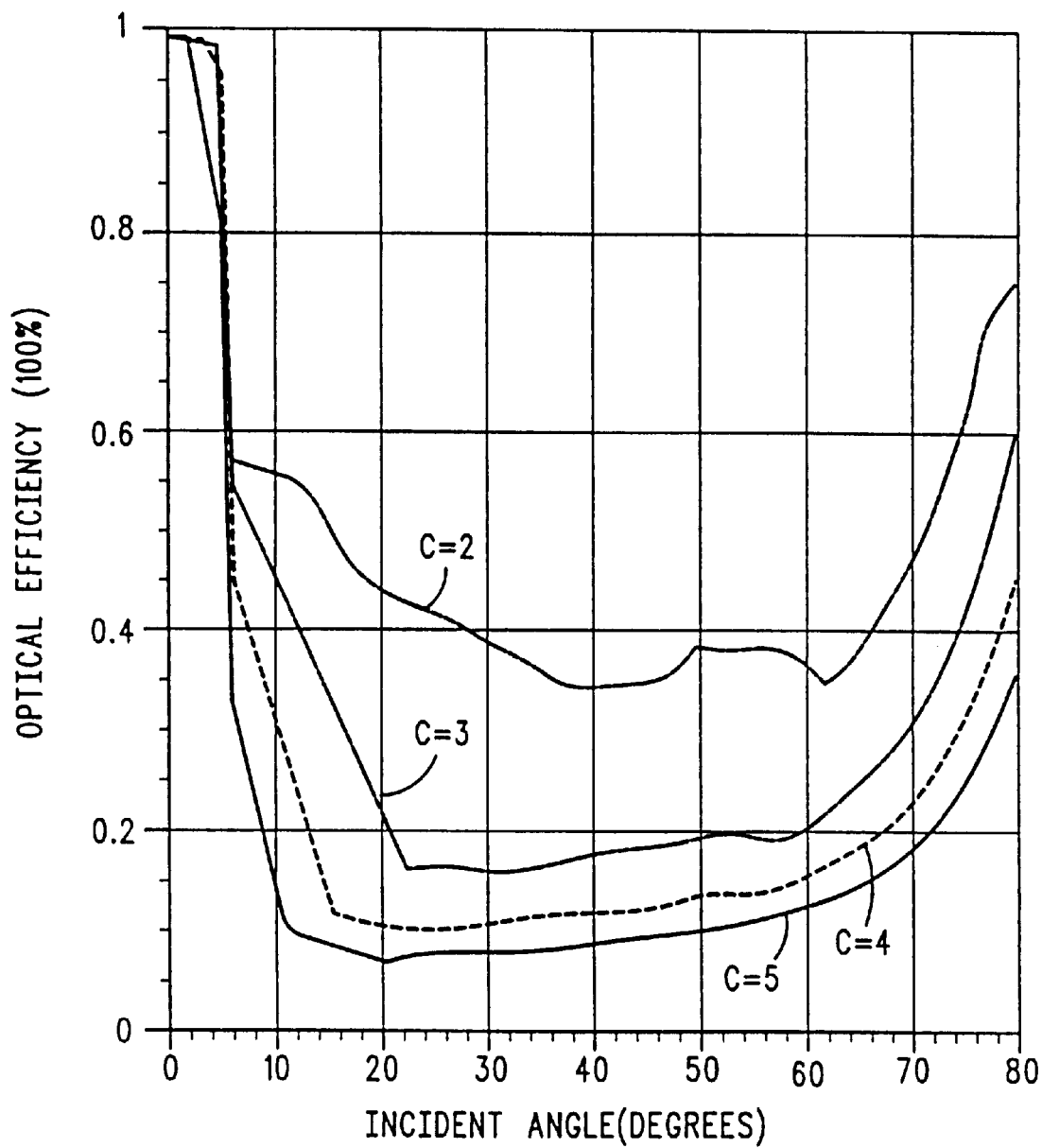
FIG. 7 illustrates angular acceptance properties of the collector with symmetric reflector of FIG. 6.

In the embodiment of FIGS. 6A and 6B, the reflector surface 32 (and 32') has a relatively large radius of curvature such that the angle of acceptance is about 5° and would require some crude solar tracking device, operative either continuously or intermittently. This design includes a small cusp arising from the small angle of acceptance. The thermal performance is quite good at elevated temperatures. FIG. 7 shows the efficiency of the symmetric reflector 32 versus incident angle of the symmetric reflector embodiment of FIGS. 6A and 6B for concentration factors of two, three, four and five with reflection or Fresnel losses ignored. Concentrations of about four are achieved with efficient 5° acceptance properties.

Thermal performance for the illustrated embodiments of the symmetric embodiments are shown in Table I below. Calculations have been performed based on an average meteorological year in Albequerque, N.Mex. The emittance for the absorber is 0.05 at T=100° C. and an absorbance of 0.95.

TABLE I

Thermal Performance

| Property | 5° ICPC (FIG. 6) | 40° ICPC (FIG.2) | 40° VG (FIG. 3) | 70° VG (FIG. 4) | 90° Circle (FIG. 5) | Flat Fin (FIG. 1) |
|---|---|---|---|---|---|---|
| Concent. | 4.00 | 1.47 | 1.16 | 1.01 | 0.94 | 0.46 |
| Gaploss | 0% | 0% | 0.25% | 0.5% | 4% | 4% |
| Thermal Efficiency (T = 100 C) | 82.4 | 62.6% | 67.4% | 70.1% | 68.5% | 64.6% |
| Thermal Efficiency (T = 150 C) | 79.7 | 57.6% | 61.0% | 62.7% | 60.6% | 50.8% |
| Thermal Efficiency (T = 200 C) | 76.1 | 50.8% | 52.2% | 52.5% | 49.8% | 32.8% |
| Thermal Efficiency (T = 250 C) | 71.1 | 42.0% | 40.8% | 39.3% | 35.9% | 12.7% |
| North South Orientation Allowed | Required | No | No | Yes | Yes | Yes |
| Need Reflector Insert | Yes | Yes | Yes | Yes | No | No |
| Reflector Silvering Required | Yes | Yes | Yes | Yes | Yes | No |
| Concentric Glass-to-Metal Seals | Yes | No | Yes | Yes | Yes | Yes |
| Shaping of Glass Tube Allowed | Yes | Yes | No | No | Yes | Yes |
| Active Tracking Required | Yes | No | No | No | No | No |

In construction of the collector 10, it is also preferable to utilize several classes of high performance solar absorber coatings on the absorber tube 28 and the heat conductor 30. Coatings can be, for example, cermets having a very low emittance (about 0.02 at 20° C.) and a high absorbance (about 0.92) over the solar spectrum. Cermets are conventional materials which have layers of dielectric materials which contain a particular fraction of metal composition disposed on a metal reflector layer having an anti-reflection coating. The top layers have lower metal fractions in the dielectric material than those layers below them. The higher metal fraction layer at the bottom absorbs more energy because visible light passes through the top layers easily. The emission of black body radiation (>2 mm wave length) is however reflected by the cermet dopant quite efficiently. Thus, emission of radiation from the bottom layer is trapped inside the absorber material, and only the low doped top layer radiates away heat. The graded metal content increases the amount of atoms seen by the incoming light so more is absorbed and also reduces the number of atoms which can radiate away heat.

Another class of materials useful as absorbers are certain ceramics which can easily be made using vacuum deposition. For example, conventional layers of $TiN_xO_y$ and $SiO_2$/$TiN_xO_y$ can be deposited onto an aluminum or copper substrate until a set amount of accumulation has been measured. Both of these types of materials have a $TiN_xO_y$ layer about 53 nm thick on a substrate. The second type of absorber material has a 90 nm layer of $SiO_2$ added. The thermal properties of such materials are very favorable for use as solar absorbers. On copper substrates an absorbance of 0.90 or higher can be achieved with an emittance of 0.06 at T=200° C. while aluminum substrates achieve absorbance as high as 0.95 and an emittance of 0.03 at T=100° C.

The above described preferred embodiments utilize a concentrically disposed absorber tube within a cylindrical reflector housing which has been evacuated. The absorber tube further includes a wedge shaped heat conduction fin coupled to the absorber, and preferably includes an absorber layer (absorbance greater than 0.90) with low emittance (less than about 0.05) to achieve a very efficient solar collector. The simplicity of this basic design allows easy manufacturing, reducing construction costs thereby making solar collector usage more practical.

Further advantages and features of the invention will be appreciated by reference to the claims set forth hereinafter. While preferred embodiments have been described, it will be clear to those of ordinary skill in the art that changes and modifications can be made without departing from the spirit and scope of the invention in its fullest aspects.

What is claimed is:

1. A nonimaging solar collector, comprising:

a housing at least partially transparent to radiation;

an absorber disposed to receive radiation wherein said absorber is non-concentrically disposed relative to said housing;

a reflector element asymmetrically disposed relative to said absorber; and a heat conduction fin coupled to said absorber and having a wedge shape tapering to lesser thickness as a function of increasing radial separation from said absorber and directed at said reflector element.

2. A nonimging solar collector, comprising:

a housing at least partially transparent to radiation in an upper portion of said housing;

an absorber disposed to receive radiation, said absorber disposed in said housing concentrically positioned about said absorber;

a reflector element disposed in a lower portion of said housing to receive solar radiation and reflect tile radiation onto said absorber; and a heat conduction fin coupled to said absorber and having a wedge shape tapering to a lesser thickness as a function of increasing radial separation from said absorber and directed at said reflector element, said heat conduction fin disposed asymmetrically relative to a substantially vertical plane through the absorber and a bottom point of said housing at a position $\pi/2$ and a top point of said housing at a position $-\pi/2$.

3. A nonimaging solar collector, comprising:

an absorber disposed to receive radiation and positioned within a housing which is at least partially transparent to solar radiation; and a reflector element disposed to receive solar radiation and reflect the radiation onto said absorber, said reflector element further includes at least two reflector portions positioned asymmetrically relative to a plane passing through said absorber and an intersection of the at least two reflector portions at a point closest to said absorber.

4. The nonimaging solar collector as defined in claim 3 wherein the absorber is disposed nonconcentrically in said housing and the two reflector portions intersect with the absorber to define an outside acute angle.

5. The nonimaging solar collector as defined in claim 3 wherein the absorber is disposed concentrically and the two reflector portions do not intersect with the absorber.

6. The nonimaging solar collector as defined in claim 3 wherein the reflector element comprises at least two portions, each having different curvature.

* * * * *

UNITED STATES PATENT AND TRADEMARK OFFICE
CERTIFICATE OF CORRECTION

PATENT NO. : 5,967,140
DATED : October 19, 1999
INVENTOR(S) : Roland Winston, et al.

It is certified that error appears in the above-identified patent and that said Letters Patent is hereby corrected as shown below:

On the cover page of the patent at item [75], the second inventor's last name should be changed from "Reis" to - - Ries - -.

Signed and Sealed this

Twenty-first Day of November, 2000

*Attest:*

Q. TODD DICKINSON

*Attesting Officer*      *Director of Patents and Trademarks*